United States I

Sasaki et al.

3,643,031

Feb. 15, 1972

[54] TIME DIVISION MULTIPLEXING COMMUNICATION SYSTEM

[72] Inventors: Hiroshi Sasaki, Chiba; Tatsuo Maruyama, Tokyo; Hisao Kanzaki, Tokyo; Yasuhiko Sakamoto, Kawasaki-shi; Nobuyuki Yasoshima, Tokyo, all of Japan

[73] Assignees: Kokusai Denshin Denwa Co., Ltd., Tokyo; Fujitsu Limited, Kawasaki, Japan, part interest to each

[22] Filed: Sept. 15, 1969

[21] Appl. No.: 857,727

[30] Foreign Application Priority Data

Sept. 16, 1968 Japan....................................43/66832

[52] U.S. Cl.................................................179/15 BS, 325/4

[51] Int. Cl.............................................................H04j 3/16

[58] Field of Search.....................325/4, 58; 343/100 ST, 203, 343/204; 179/15 AE, 15 AL, 15 BS, 15 BA

[56] References Cited

UNITED STATES PATENTS

| | | | |
|---|---|---|---|
| 3,320,611 | 5/1967 | Sekimoto et al. | 325/4 |
| 3,349,398 | 10/1967 | Werth | 343/100 ST |
| 3,418,579 | 12/1968 | Hultberg | 325/58 X |
| 3,532,985 | 10/1970 | Glomb et al. | 325/58 X |
| 3,532,987 | 10/1970 | Turriere | 325/58 X |

*Primary Examiner*—Kathleen H. Claffy
*Assistant Examiner*—David L. Stewart
*Attorney*—Curt M. Avery, Arthur E. Wilford, Herbert L. Lerner and Daniel J. Tick

[57] ABSTRACT

A time division multiplexing communication system has a plurality of stations and a switching station. Two of the stations communicate with each other via the switching station by utilizing signals comprising a block having a plurality of words each comprising a plurality of frames which are bursts of a constant time length. Each of the stations comprises channel rearrangement control means for rearranging ground channels to satellite channels and for rearranging satellite channels to ground channels in accordance with informations from an order data channel. Burst synchronism control means connected to the channel rearrangement control means provides the timing of transmission and reception of bursts. Order word controls means connected to the channel rearrangement control means receives command data, provides an order data channel, changes the command data to the format of the order data channel, transmits the format to the other stations and assembles a word from the order data channel information received from the other stations. Command control means is connected to the order word control means, the channel rearrangement control means and the burst synchronism control means and is controlled by a program to discriminate the condition of operation of the channel rearrangement control means, the burst synchronism control means and the order word control means, and supplies thereto command data commanding the means to operate. The order word control means transfers the work assembled from the order data channel received from the other stations to the command control unit when the word is directed to the station. Block synchronism controlling means controls the timing of transmission and reception of the blocks and provides block synchronism for blocks of period TB determined in accordance with the equations $$nTB \geq Tl + TP$$

and $$(n-1)TB \leq TS$$

wherein $TB$ is the period of the block period, $TS$ is the period of time required for an electrical wave to travel from the station closest to the switching station and back to the station, $Tl$ is the period of time required for an electrical wave to travel from the station farthest from the switching station and back to the station, $TP$ is the period of time required for each of the stations to provide the necessary operations based on received information and $n$ is a positive integer.

9 Claims, 20 Drawing Figures

PATENTED FEB 15 1972 3,643,031

SHEET 01 OF 13

CONTROL UNIT

TIME DIVISION MULTIPLEXING COMMUNICATION SYSTEM

DESCRIPTION OF THE INVENTION

The invention relates to a time division multiplexing communication system. More particularly, our invention relates to a satellite communication system which provides communication between a plurality of ground stations via a satellite repeater station in space. The satellite communication system is utilized primarily in a telephone exchange system.

We have adapted a satellite communication system to perform as a time division multiplexing multiple access communication system. In accordance with our invention, a time slot is allotted to each ground station and each ground station transmits the compressed information within its allotted time slot. The tie slot is hereinafter referred to as the burst. The burst must be transmitted by controlling its time position from the ground station so that said burst may be located at the designated position in the satellite repeater station in order to avoid mutual interference between a plurality of ground stations and to particularly avoid erroneous connection and increase of noise when the system is utilized as a telephone exchange system.

The object of the present invention is to effectively utilize the satellite channels. It is assumed, for the sake of illustration, that a large number of calls are made from a specific station A and a small number of calls are made from another station B in a specific period of time. It is further assumed that a specific constant number of satellite channels are allotted to each of the stations. All the calls from station A cannot then be received and some calls that cannot be received are required to wait. On the other hand, all the satellite channels allotted to station B are not utilized. That is, some of the satellite channels are left idle and no talking or voice information is transmitted via these idle channels. In order to eliminate this disadvantage, this invention allots satellite channels to a station corresponding to the number of calls from the station.

In varying the number of satellite channels allotted to a plurality of stations in correspondence with the number of calls from the stations, the number of calls from the stations are previously indicated via data channels and the satellite channels allotted to the stations are adjusted to prevent bursts from mutually overlapping or the frame length from being exceeded.

If a station arbitrarily changes the number of satellite channels allotted thereto, however, the receiving station cannot have sufficient time to prepare to receive the calls from such station. This results in information being momentarily disrupted or misconnected. In accordance with the invention, in order to prevent such momentary interruption or misconnection of information, the number of satellite channels allotted to a plurality of stations is changed simultaneously, and in order to facilitate the simultaneous change, the blocks utilized each comprise several frames.

Furthermore, when exchange signals transmitted from a specific or reference station of a plurality of stations in a communication system are received by all the ground stations, the channels are exchanged simultaneously at the timing of the interblock break point immediately after the signal reception. In accordance with this system, the channels are exchanged very smoothly, without momentary disconnection or confusion of the talking or voice information. This is realized by determining the block period *TB* to satisfy Equations (1) and (2), as hereinafter disclosed.

The principal object of our invention is to provide a new and improved time division multiplexing communication system.

An object of the invention is to provide a new and improved satellite communication system adapted for time division multiplexing multiple access operation.

An object of the invention is to provide a satellite communication system operating as a time division multiplexing communication system which is synchronized with facility and rapidity to prevent interference in the system and erroneous connection and increase of noise.

An object of the invention is to provide a satellite communication system operating as a time division multiplexing communication system which responds immediately to modification of the channel allotted to each ground station in accordance with increase and decrease of traffic in order to utilize the channel with maximum effectiveness.

An object of the invention is to provide a satellite communication system operating as a time division multiplexing communication system which corrects transmission errors with rapidity and effectiveness.

An object of the invention is to provide a satellite communication system operating as a time division multiplexing communication system in which the command unit is provided economically by effective reduction of the load applied to the command unit due to utilization of program control which determines the condition of operation of various types of control components utilized for transmission and reception of information and controls the operation of such components.

An object of the invention is to provide a satellite communication system operating as a time division multiplexing communication system which functions with efficiency, effectiveness and reliability.

In accordance with the present invention, a time division multiplexing communication system has a plurality of stations and ground channels. Each station of the system comprises a channel rearrangement control unit for controlling the rearrangement operation of the ground channels. A burst synchronism control unit connected to the channel rearrangement control unit provides synchronism control of the transmission and reception of burst and the formation of the control information. An order word control unit connected to the channel rearrangement control unit and the burst synchronism control unit controls the transmission and reception of order word channels. A command unit connected to the order word control unit, the channel rearrangement control unit and the burst synchronism control unit determines the condition of operation of and controls the operation of each of the order word control unit, the channel rearrangement control unit and the burst synchronism control unit. The channel rearrangement control unit includes a block synchronism control comprising a word having a constant number of signal frames and a block having a plurality of the words. Block synchronism is provided in accordance with the equations $$nTB \geq TI + TP \text{ and } (n-1)TB < TS$$

wherein *TB* is the block period, *TS* is the period of time required for an electrical wave to travel from the station of the system closest to a specific point to the point and return from the point to the station, *TI* is the period of time required for an electrical wave to travel from the station of the system farthest from the specific point to the point and return from the point to the station and *TP* is the time required for providing necessary operations based on received information. The specific point is a satellite in space.

The time division channels are intended to mean the ground channels, and particularly mean the trunks TRK1, TRK2, ... of the ground station. The time division multiplexing channels are intended to mean the satellite channels and particularly CH1, CH2, ... . includes a standard station for transmitting the command for switching of the connecting corresponding relation between channels to all the stations at an arbitrary time in broadcasting type in a manner whereby a station of the plurality of stations receiving the switching command writes the new connecting corresponding relation between channels into the channel number memory circuit held in reserve and switches the previously utilized channel number memory circuit to reserve and the station transmits audio information by the new connecting corresponding relation at the instant of completion of transmission of a word at the head of the first transmitting block after the reception of the switching command.

The timing of the switching command signal EX is performed just after the standard station transmits the word SW. The standard station determines which block the signal EX is to be sent out in.

The channel rearrangement control unit includes a second pair of channel memory circuits. One of the second pair of channel number memory circuits is utilized and the other is held in reserve. The previously reserved channel number memory circuit of the second pair is switched to utilization and the previously utilized channel number memory circuit of the second pair is switched to reserve after a delay of a number of blocks equal to the time required for the propagation of an electrical wave between stations after the reception of the switching command.

The command unit includes a first memory for storing transmitting information, transmitting block number and transmitting word number relation to the transmitting information.

The order word control unit includes a second memory for requesting retransmission and storing the transmitting station number, receiving block number and receiving word number of received information. The order word control unit corrects error by providing the request for retransmission from the stored contents of the second memory and retransmitting the transmitting information from the stored contents of the first memory.

The order word control unit comprises a receiving memory for receiving and storing order channels. A coincidence-detecting circuit is coupled to the receiving memory for supervising the coincidence of data stored in the receiving memory with the block synchronism signal pattern. A counter group coupled to the coincidence-detecting circuit includes a block counter for counting the number of blocks equal to the time required for the propagation of an electric wave between stations, a word counter for counting the number of words in a block and an order channel counter for counting the number of order channels in a word. The time of initiation of a word and a block is corrected to provide a coincidence-detecting output relating to the block synchronism signal pattern of a specific station in the frame of the coincidence detecting output of the block synchronism signal pattern of a standard station provided by counting of the counter group and for synchronizing so that gaps in blocks of all the stations of the system are received in the same frame.

When the word counter and the order channel counter have specific magnitudes a synchronous condition is supervised in accordance with the provision of the coincidence-detecting circuit of a coincidence output relating to the block synchronism signal pattern.

The order word control unit comprises a receiving memory for successively storing received informations. A receiving buffer memory coupled to the receiving memory restores the stored information of the receiving memory when a specific magnitude of informations have been stored in the receiving memory. The receiving buffer memory stores a bit indicating if the information is directed to the station of the receiving buffer memory. Only the information directed to the station of the receiving buffer memory is transmitted to the command unit under the control of the last bit. The receiving buffer memory has a bit position for indicating whether information is directed to the station thereof in the address for storing decoded information.

The order word control unit further comprises a discriminating circuit coupled to the receiving buffer memory for determining the station to which a signal is to be transmitted. A check decoding detecting circuit is coupled to the receiving buffer memory. The receiving buffer memory stores decoded information. When a signal is determined to be directed to the station of the discriminating circuit by the discriminating circuit and when received information is determined to be error-free by the check decoding detecting circuit, the received information is written into the specific bit position of the receiving buffer memory.

In order that our invention may be readily carried into effect, it will now be described with reference to the accompanying drawings, wherein.

Figure 1A:
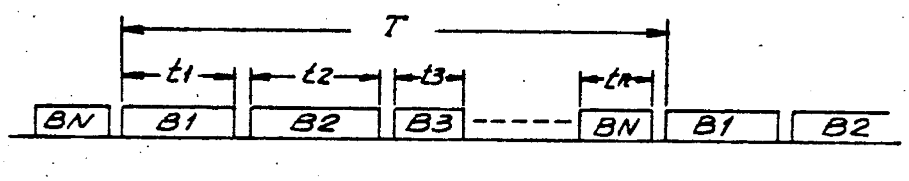
FIGS. 1A and 1B are graphical presentations for assisting in explaining the operation of the time division multiplexing multiple access communication system of our invention.

FIG. 1A shows the outline of signals in the PCM time division multiplexing multiple access communication system of the invention. In FIG. 1A, T is a repetition period for the sampling of aural or audio signals. Data or information other than voice or audio signals may be transmitted within the repetition period T. The repetition period T is referred to as the frame.

In FIG. 1A, PCM information train transmitted by N-ground stations of the communication system of the invention comprises a plurality of bursts B1, B2, . . . BN. Each burst comprises control information or data and voice information or data, or other information or data.

Figure 2A:
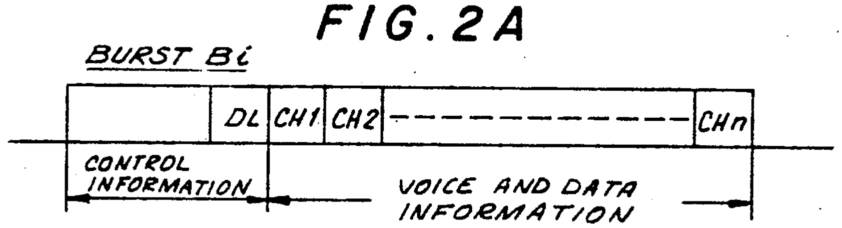
FIGS. 2A, 2B and 2C are graphical presentations for assisting in explaining the channel allotment in the time division multiplexing multiple access communication system of the invention.

FIG. 2A illustrates a burst. In FIG. 2A, the time division multiplexing multiple access communication channels are CH1, CH2, . . . CHn. In FIG. 2A, a ground station *i* transmits a burst Bi and utilizes *n* channels CH1 to CHn for transmission of voice and other data. The control information is in the form of an order word and is transmitted via a channel DL.

Figure 1B:
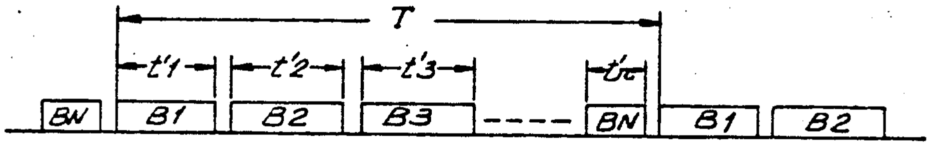
Figure 2B:
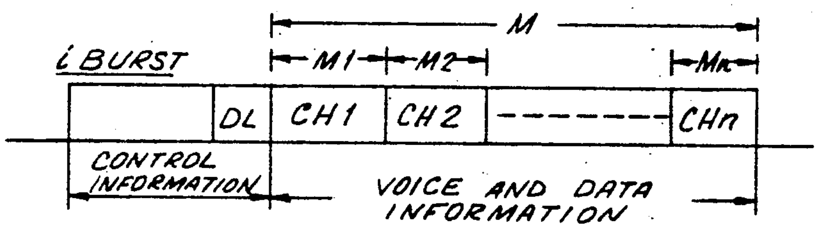
Figure 2C:
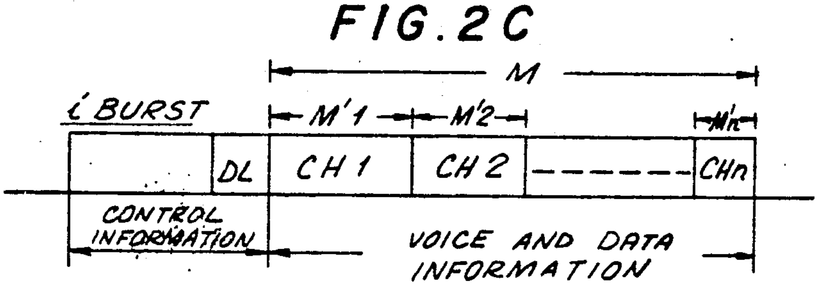
Figure 3:
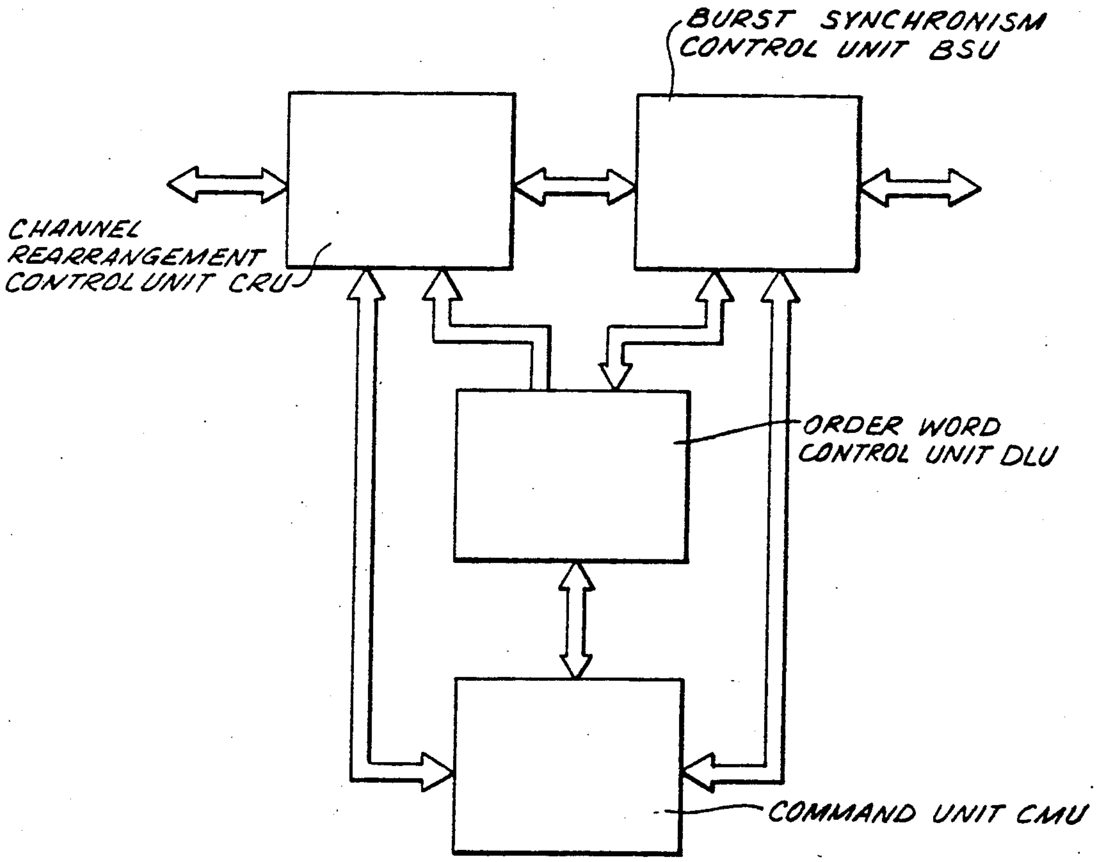
FIG. 3 is a block diagram of an embodiment of the control circuit of the time division multiplexing multiple access communication system of the invention.

FIG. 3 illustrates a control circuit for controlling the signals illustrated in FIGS. 1A, 1B, 2A, 2B and 2C.

In FIG. 3, a channel rearrangement control unit CRU controls the rearrangement operation of the PCM time division channel and the PCM time division multiple access channel. The channel rearrangement control unit CRU is connected to a burst synchronism control unit BSU which controls the synchronism of transmission and reception of bursts, and which provides control information.

Each of the channel rearrangement control unit CRU and the burst synchronism control unit BSU is connected to an order word control unit DLU. The order word control unit DLU controls the transmission and reception in the order word channel. A command unit CMU is connected between the order word control unit DLU and each of the channel rearrangement control unit CRU and the burst synchronism control unit BSU. The command unit CMU is subject to program control and determines or discriminates the condition of operation of each of the order word control unit DLU, the channel rearrangement control unit CRU and the burst synchronism control unit BSU. An electronic computer is used as this command unit CMU.

A satellite communication system utilizing our invention is hereinafter described. The invention, however, is not limited to a satellite communication system. The PCM time division channel is hereinafter referred to as the ground channel and the PCM time division multiple access channel is referred to as the satellite channel.

Figure 4A:
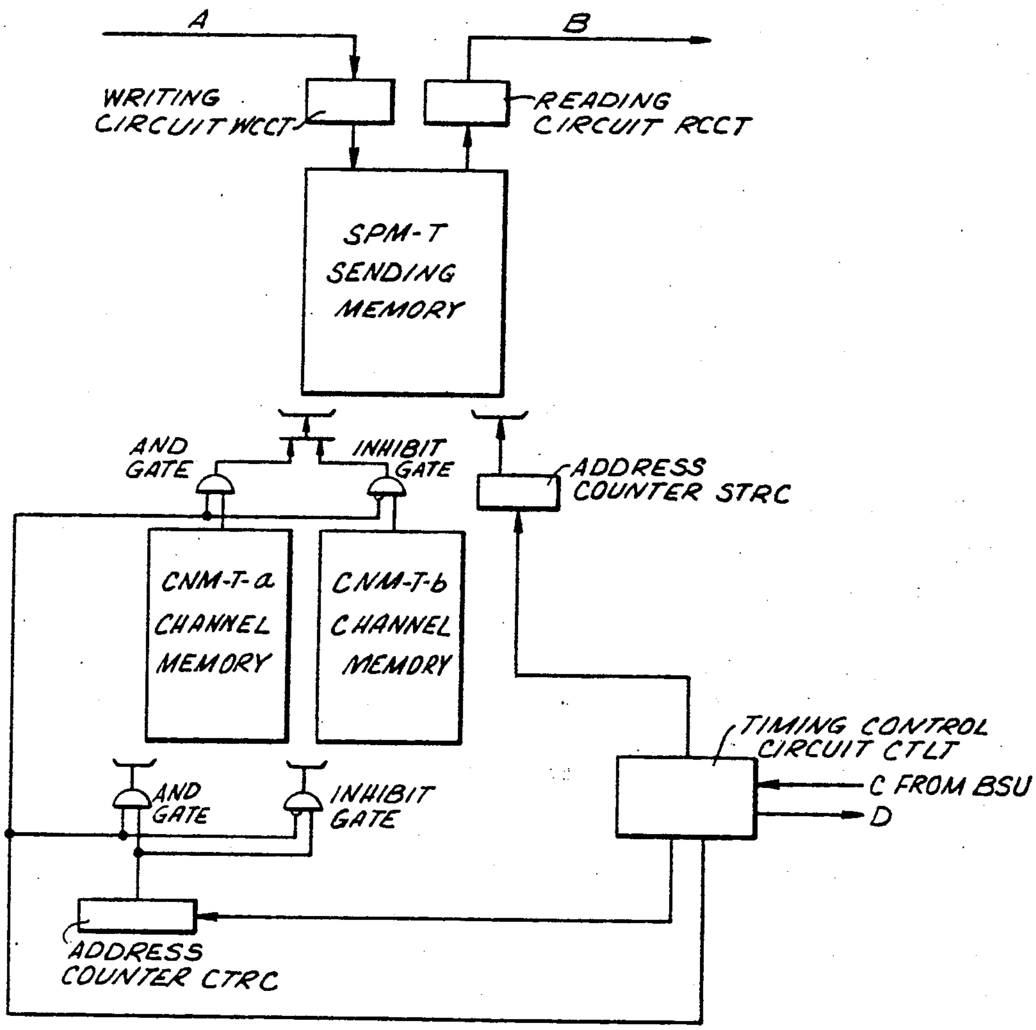
FIG. 4A is a block diagram illustrating the operation of the transmission part of the channel rearrangement control unit of the control circuit of FIG. 3.
Figure 4B:
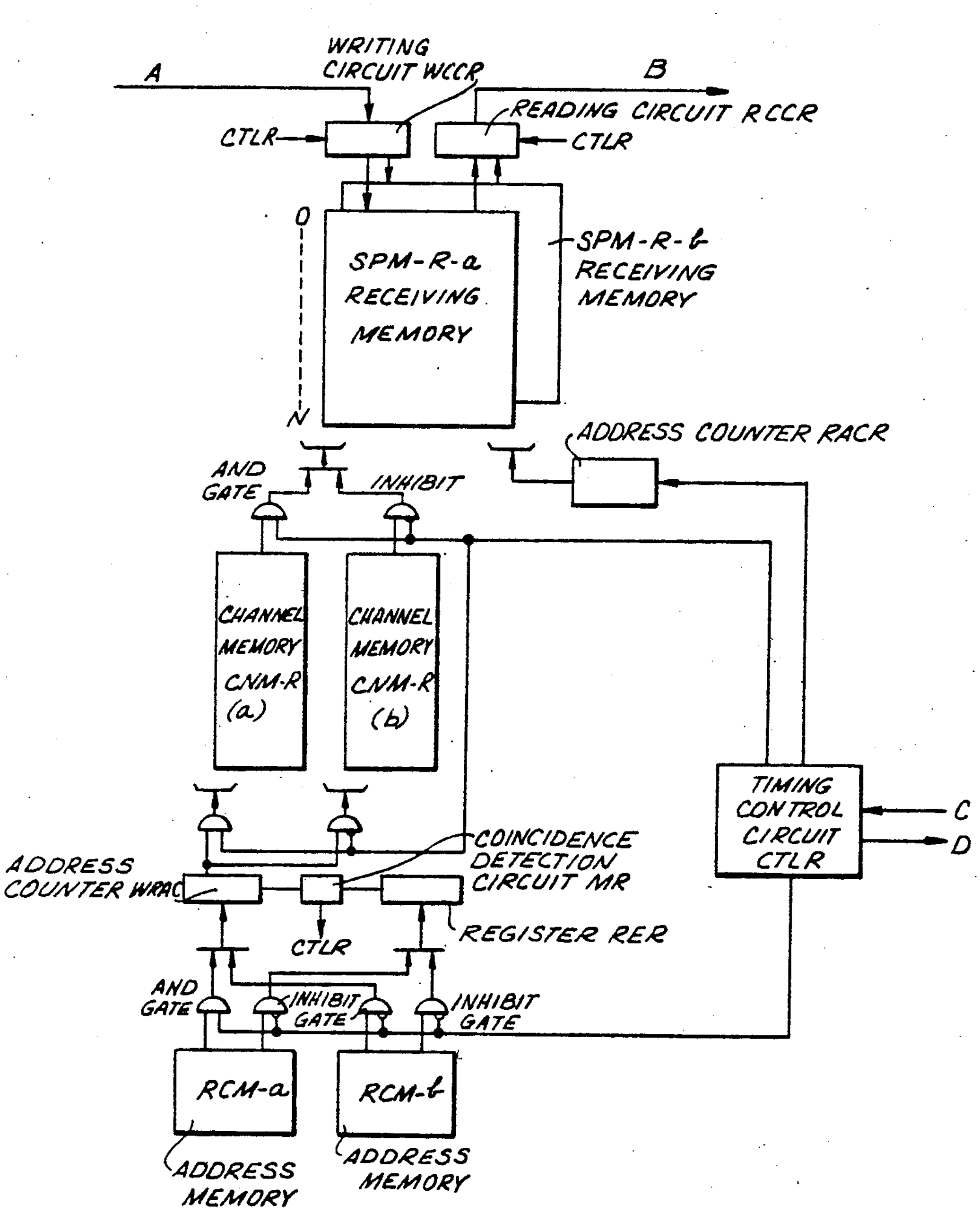
FIG. 4B is a block diagram of the receiving part of the channel rearrangement control unit of the control circuit of FIG. 3.

The channel rearrangement controlling operation will be now explained with reference to FIGS. 4A and 4B showing the constitution of channel rearrangement control unit CRU shown in FIG. 3.

It is the main function of the circuit of FIG. 4A to rearrange the transmitting communication signals arranged according to the channel arrangement within the station to which said circuit belongs into the channel arrangement on the transmitting burst of the type commanded from command unit CMU and to send out the transmitting communication informations according to the timing signal sent from burst synchronism control unit BSU at a timing suited for the sending out of the transmitting burst together with the control information by burst synchronism control unit BSU. In FIG. 4A, A shows transmitting communication signals arranged according to the channel arrangement within said station, and B shows transmitting communication informations rearranged into the channel arrangement type designated as the transmitting burst and sent to burst synchronism control unit BSU. CTLT is a control circuit for controlling the channel rearranging operation of channel rearrangement control unit CRU by timing signal C from burst synchronism control unit BSU.

SPM-T is a memory. Read-out and write-in cannot be performed simultaneously. Thus, write in of communication data from the trunk and read out of said data for transmission to the satellite channel in a single SPM-T may be made possible by shifting the times for write in and read out. However, the communication data is a PCM signal which is obtained by sampling the voice signal from the trunk. Thus, if the number of trunks increases, it becomes difficult to control the time of read out of SPM-T and the time of write in thereof.

Thus, a double SPM-T is provided, and while the PCM signal is written in one SPM-T during a specific frame period, data of the other SPM'T is read out. During the following frame period, the data of the SPM-T written in, in the previous frame, is read out and the PCM signal is written into the other SPM-T from which data was read out in the previous frame. The control is simplified by switching the use of the double SPM-T every frame, as hereinbefore described. SPM-T is a sending memory capable of addressing for one memorizing the transmitting communication signal to rearrange the transmitting communication signal from the channel arrangement within said station into the channel arrangement in the transmitting burst, and each word of said memory memorizes the transmitting communication signals for one channel. And this memory consists of, for example, a well-known core memory, IC memory or thin film memory. The number of words in equal to the maximum number of channels allotted to the station having this device and the address constitution corresponds to the order of channels in the transmitting burst, and in the sending out, the addresses are read out successively beginning with the foremost address. STRC is an address counter for designating the reading address of sending memory SPM-T. And each time a word is read out of sending memory SPM-T, 1 is added to the content. The sending memory SPM-T has a single or double constitution. The object of the double constitution is to prevent the mutual overlapping of the writing and reading times due to channel rearrangement. WCC T is a writing circuit for writing the transmitting signal into SPM-T, and RCC T is a reading circuit for reading the transmitting signals from sending memory SPM-T and sending out said signals to BSU. As the address constitution of SPM-T corresponds to the order of channels of the transmitting burst, the writing of the transmitting signal from writing circuit WCCT into sending memory SPM-T must be performed per each channel, and the writing is performed into the address corresponding to the channel. CNM-T is a channel memory capable of addressing for separately memorizing the addresses on SPM-T into which the channels are to be written and the number of words of this memory is equal to the number of words of SPM-T. Each word corresponds to a channel of said station's transmitting signal and the address constitution also corresponds to said station's channel arrangement. Channel memory CNM-T has double or more than double constitution, and the channel arrangement after the movement of the burst is written in the reserve CNM-T-b in advance before the movement of the burst and this reserve CNM-T is switches with the presently used CNM-T-a in the movement, whereby the channel rearrangement is changed. At the time of switching in the movement of the burst, the synchronism switching considering the time required for propagation of signals between stations is effective in preventing momentary interruption of signals. CTRC is an address counter for designating the reading address of channel memory CNM-T, and this CTRC designates the address for continuously reading out CNM-T by the control of CTLT at a timing suited for the words of CNM-T to show the addresses on SPM-T for writing the channels of the transmitting signals arranged according to the channel arrangement within said station corresponding to said words. In other words, each time a word of CNM-T is read out, 1 is added to the content. STRC is an address counter for designating the continuous reading out of the content of SPM-T from the predetermined reading out starting address. The information read out successively from SPM-T by the content of STRC are sent to burst synchronism control unit BSU as sending out communication informations and the control signal is added to these informations and these constitute the transmitting burst. Therefore start and stop of reading out of sending memory SPM-T by the content of address counter STR C are also performed by the control of CTLT.

The main function of the circuit of FIG. 4B is to discriminate the channel to be received by the station to which said circuit belongs from the communication informations of all the bursts within the frame and rearrange said channel into the channel arrangement within said station. The channel to be received and the type of the channel rearrangement are determined by the command from command unit CMU. In FIG. 4B, A shows communication informations included in the receiving burst sent from burst synchronism control unit BSU from which the control information has been excluded, and B shows receiving communication signals rearranged into the channel arrangement type within said station. SPM-R is a receiving memory capable of addressing for once memorizing the communication signals of the receiving channel to rearrange said signals into the channel arrangement type within said station, and each word of said memory memorized the receiving communication signal of one channel. And this memory consists of, for example, a well-known core memory, IC memory or thin film memory. The number of words is equal to the maximum number of channels allotted to the station having this device, and the address constitution corresponds to the channel arrangement within said station. SPM-R has a double constitution and comprises SPM-R-a and SPM-R-b. This is in order to perform writing and reading alternately in each frame as there is a possibility that the receiving channels are distributed in the entire frame. The switching between the writing and reading is performed by control circuit CTLR. WCCR is a writing circuit for writing the receiving communication signals into SPM-R, and RCCR is a reading circuit for reading the receiving communication signals out of SPM-R. As the address constitution of SPM-R corresponds to the channel arrangement within said station, in the writing of receiving communication signals from writing circuit WCCR into SPM-R, it is necessary to discriminate whether each of all the channels of all the receiving bursts is the channel to be received or not and also to write the discriminated receiving channels into the corresponding addresses on SPM-R arranged according to the channel arrangement within said station. CNM-R is, therefore, a channel memory capable of addressing for memorizing whether each of all the channels within the frame is the channel to be received or not and for separately memorizing the addresses on SPM–R into which all the receiving channels are written. And this memory consists of, for example, a well known core memory, IC memory or thin film memory. The number of words of CNM–R is equal to the number of all the channels included in a frame but it is in general unnecessary to receive the transmitting burst of said station and therefore the number of words can be equal to the number available by subtracting the minimum number of transmitting channels of said station from the number of all the channels within the frame. However, there is no essential difference between these two. The address constitution of CNM–R corresponds to the channel arrangement order within the frame, and the last address communicates with the foremost address. Words are read out continuously from CNM–R by the addressing by the contents of WRAC, and each of the readout words represents whether the channel corresponding to said word should be received or not and the address on SPM–R into which the communication signal of the channel is written when said channel is to be received. WRAC is an address counter for designating the reading address of CNM–R. And the reading start address and end address are stored in register RER. The contents of the register RER are set from RCM in each burst. RCM is an address memory capable of addressing in each burst for memorizing the reading start address and end address of CNM–R for all the bursts, and this RCM has double constitution. Change of position and length of the receiving burst is designated by rewriting the contents of memory RCM from command unit CMU but this is accomplished by the synchronism considering the transmitting station and the time required for the propagation of signals between stations, and the control of the above can be facilitated by the double constitution of memory RCM. In order to read out of CNM–R continuously, 1 is added to the contents of WRAC each time a word is read out of CNM–R.

The reading out is started by CTLR and the moment of end of reading out of each burst is detected by sending the information of detection of coincidence of contents of WRAC and RER to CTLR. MR is a coincidence circuit for detecting the coincidence of the contents of WRAC and RER. RACR is an address counter for reading out the contents of SPM–R continuously. This can be realized by starting with the reading out of a specific address (in general, 0 address) and adding 1 to the contents of RACR each time a word is read out of SPM–R. Control of start, stepping and switching of these circuits included in CRU–R is performed by control circuit CTLR.

The time division multiplexing multiple access communication system of the invention may be utilized in the following two channel rearrangement systems. In one system, the number of satellite channels allotted to each station is fixed in time, but the satellite channels may be transmitted to any station of the communication system. In the switching of channels in such a system, the number of idle satellite channels in all the stations is totaled at a constant time interval and the channels are properly allotted to the stations. Therefore, the number of the usable satellite channels of each station is increased or decreased in accordance with the traffic at a constant time interval. Consequently, as shown in FIGS. 1A and 1B, for example, the burst length of each station is increased or decreased, so that the bursts move. The burst length varies with the variable destination demand assignment of the time allotment.

In the other system, the number of satellite channels allotted to each station is fixed in time and, as shown in FIG. 2B, the station to which each satellite channel is transmitted is fixed. That is, for example, the satellite channel in CH1 is transmitted to station A, the satellite channel in CH2 is transmitted to station B, . . . the satellite channel in CHn is transmitted to station X. In this system, in the switching of the channels, the number M of the satellite channels allotted to each station is not changed at a constant time interval, but the number M1, M2, . . . Mn of the satellite channels transmitted to the stations is changed to M'1, M'2, . . . M'n, as shown in FIG. 2C. The suffix M1, M2, . . . , M'1, M'2, . . . indicates the number of M. Data for the same station is allotted to the same suffix.

M1, M2 . . . further includes some channels. For example, if it is assumed that M1 is designated for station A and M2 is designated for station B, during a specific period of time, the channels for station A are ten channels, that is, M1=10, and the channels for station B are five channels, that is, M2=5. However, during the following period of time, the channels for station A are three channels, that is, M'1=3, and the channels for station B are eight channels, that is, M'2=8. Accompanying the change of the number of satellite channels transmitted to the stations, the number of satellite channels allotted to each station is also changed. That is, as shown in FIG. 1B, the burst length of each station is increased or decreased and the bursts move.

In order to switch the channels, as hereinbefore described, without instantaneous interruption and configuration or crosstalk between stations, it is necessary to switch between the channel number memory circuit which is utilized and the channel number memory circuit which is held in reserve in the channel rearrangement control unit CRU, and to provide movement of the bursts in synchronism with respect to all the stations in the communication system. In order to accomplish this, we provide word synchronism and block synchronism for all stations in the communication system with regard to the word constituted in the order word channels DL of one frame or a plurality of frames, which word is the unit of order and command word transmission between the stations (FIGS. 2A, 2B and 2C).

Figures 5A, 5B, 5C:
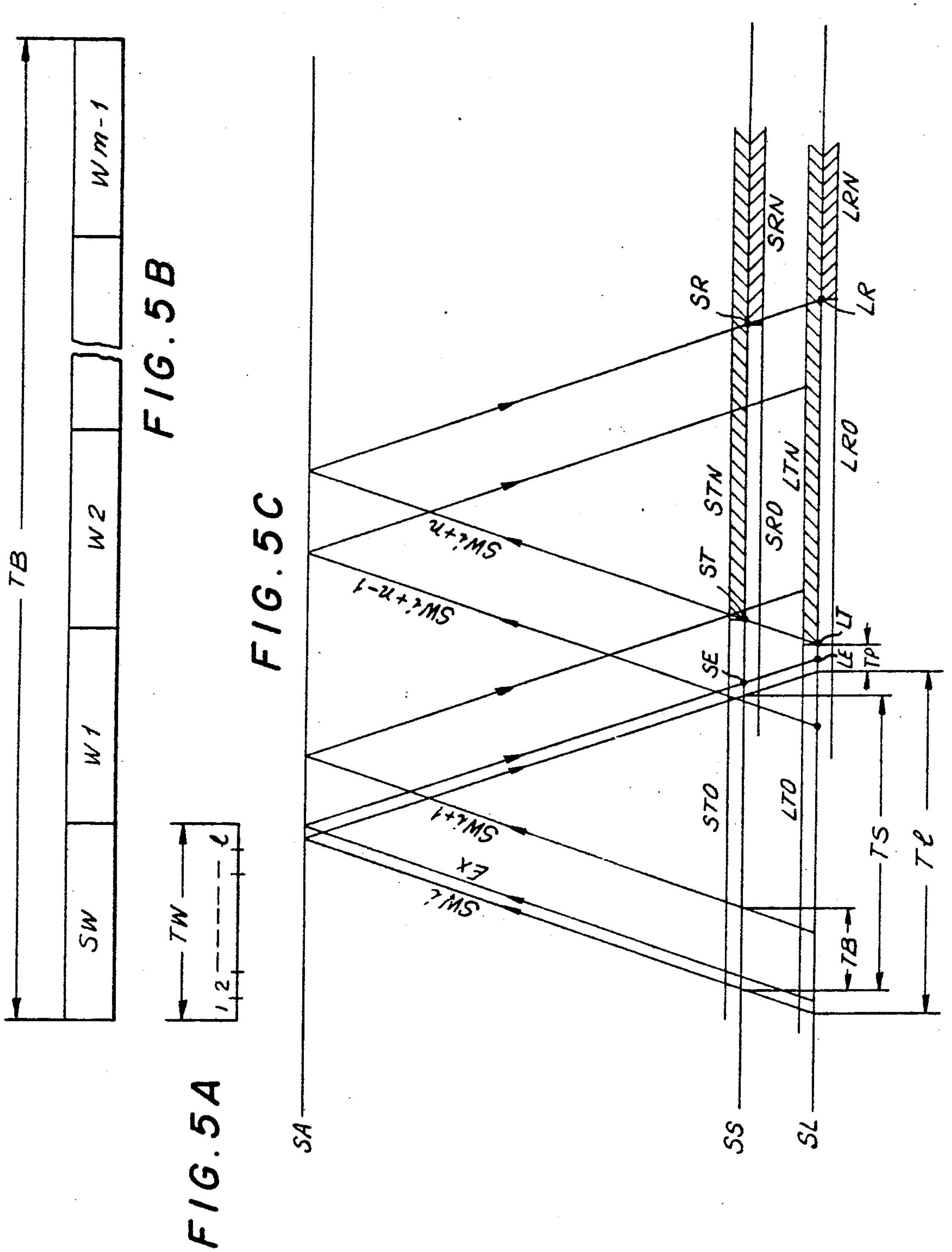
FIGS. 5A, 5B and 5C are graphical presentations for assisting in explaining channel rearrangement switching by word synchronism and block synchronism in the time division multiplexing multiple access communication system of the invention.

FIG. 5A shows the word and the block. The word has a period TW and comprises order word channels of a single frame. The block has a period TB and comprises *m* words SW, W1, W2, . . . Wm–1, as shown in FIG. 5B. The word SW has the same pattern in all the stations and is the block synchronism word indicating the head of the block. The order word between stations is exchanged by W1, W2, . . . Wm–1.

FIG. 5C assists in explaining the synchronous switching of channels utilizing the order word channel in which word synchronism and block synchronism have been realized. In FIG. 5C, the abscissa represents time and the ordinate represents distance. The communication satellite is represented by SA, the station nearest the satellite is represented by SS and the station farthest from the satellite is indicated by SL. The block synchronism words are SWi, Swi+1, SWi+2, . . . Swi+*n–1*, *Swi+n*.

The switching command signal EX is transmitted from a specific station, hereinafter referred to as the standard station, of the communication system. The switching command signal EX is transmitted immediately following the word SW, that is, in the position W1, to all the stations, including the standard station, via the satellite by order data channel DL in broadcasting style. Each station, upon receiving the switching command signal EX writes the new corresponding relation between the ground channel and the satellite channel in the channel number memory circuit of the channel rearrangement control unit CRU which is held in reserve. The switching between the channel number memory circuit used and the reserve channel number memory unit in the transmitting part of the channel rearrangement control unit CRU is achieved by the first transmitting block synchronism time after the reception of the switching command signal EX. The transmitting block synchronism time is provided from the order or command word control unit DLU (FIG. 3), hereinafter described in detail, upon the completion of transmission of the block synchronism word.

In FIG. 5C, the channel of the transmitting part of the station SS is STO in the old arrangement and STN in the new arrangement. The channel of the transmitting part of the station SL is LT0 in the old arrangement and LTN in the new arrangement. The switching command signal EX from the standard station is synchronous with the block synchronism word SW1. That is, in the transmitting part of the station SS, switching between the channel number memory circuit used and the channel number memory circuit in reserve is provided at the time ST and such switching is provided in the transmitting part of the station SL at the time LT.

In order to accomplish the switching of the channel number memory circuits (FIGS. 4A and 4B) by the first transmitting block synchronism time after the reception of the switching command signal EX in the same block, as shown in FIG. 5B, the block period or synchronism TB must satisfy the following equations:

$$nTB \geq Tl+TP \quad (1)$$

$$(n-1)TB \leq TS \quad (2)$$

The number of blocks $n$ required while the electrical wave is transmitted to and returned from the satellite may therefore be expressed, from Equations (1) and (2) as:

$$n \leq Tl+TP/Tl+TP-TS \quad (3)$$

wherein $Tl$ is the period of time required for the electrical wave to travel from the station SL to the satellite and return from the satellite to said station, $TS$ is the period of time required for the electrical wave to travel from the station SS to the satellite and return from the satellite to said station, $TP$ is the reserve time required for writing into the reserve channel number memory circuit at the station SL and TB is the block period. In order to synchronize the block with rapidity, it is therefore desirable that the block period be as brief as possible. Consequently, it is desirable to provide the block period TB with a maximum value of $n$ in satisfaction of Equation (3).

In FIG. 5C, the channel of the receiving part of the station SS is indicated by SRO in the old arrangement and the channel in the new arrangement is indicated by SRN. The channel of the receiving part of the station SL is LRO in the old arrangement and LRN in the new arrangement. That is, the station SS provides switching between the channel number memory circuit used and the channel number memory circuit held in reserve in the receiving part at the time SR (FIGS. 4B and 5C), that is, when the receiving block synchronism time has been counted $n$ times after receiving the switching command signal EX. The station SL provides the same switching at the time LR, that is when the receiving block synchronism time has been counted $n$ times after receiving the switching command signal EX. The receiving block synchronism time is provided by the order word control unit DLU (FIG. 3), when the block synchronism word is received.

Figure 6:
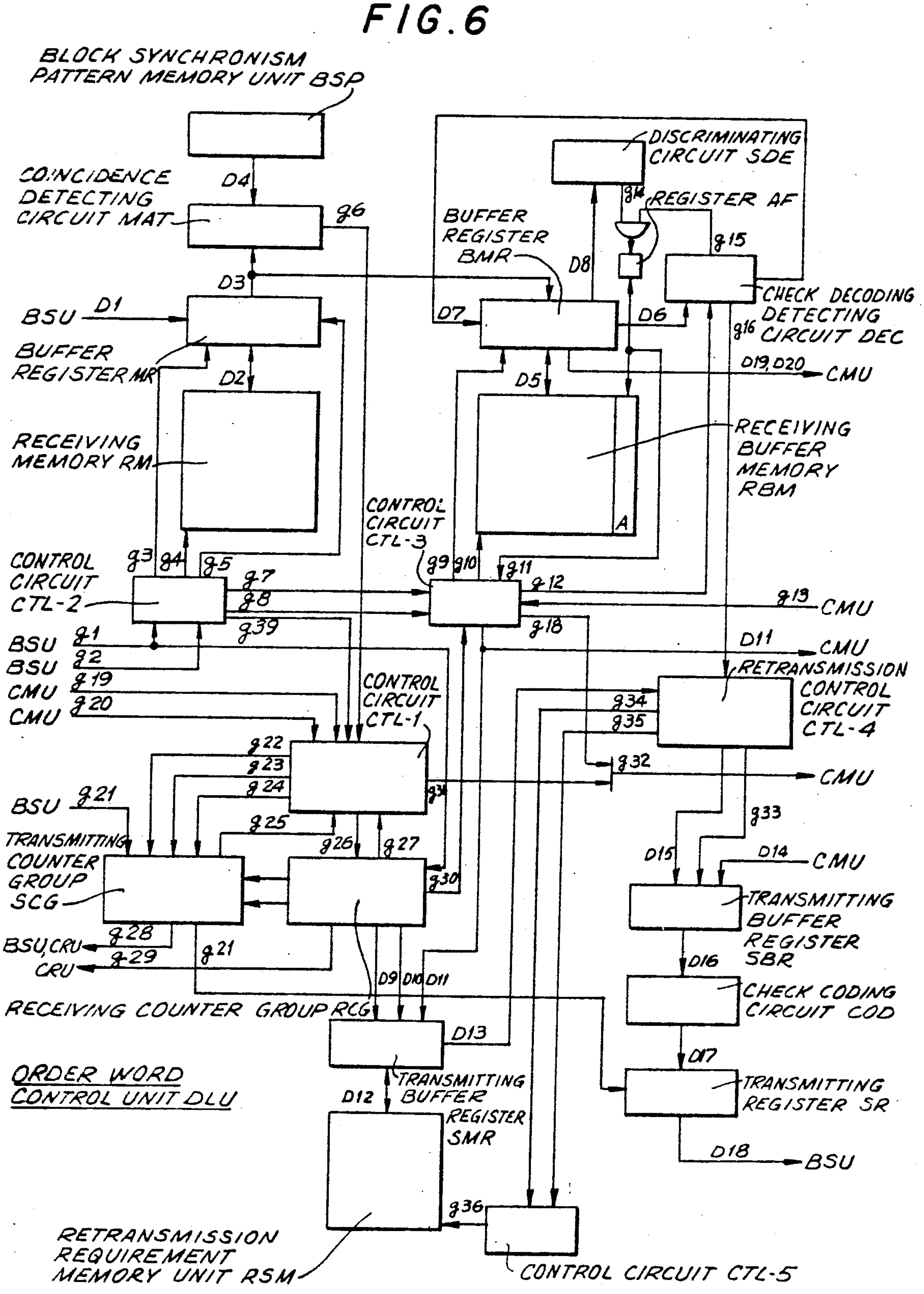
FIG. 6 is a block diagram of an embodiment of the order word channel control unit of the control circuit of FIG. 3.

The order word control unit DLU of FIG. 3 is shown in FIG. 6. Word synchronism, block synchronism and automatic retransmission error correction are explained with reference to FIG. 6. In FIG. 6, $g$ indicates control signals, D indicates data information and CTL indicates control circuits. A block synchronism pattern memory unit BSP records or stores the block synchronism word indicating the head of the block, which block synchronism word has the same pattern in all the stations of the system. A coincidence-detecting circuit MAT compares the memory pattern of the block synchronism pattern memory unit BSP with the received data transmitted to a buffer register MR from the burst synchronism control unit BSU (FIG. 3) and thereby always detects the head of the block.

The received information stored in the buffer register MR is written into a receiving memory RM. A receiving buffer memory RBM newly stores the information stored in the receiving buffer memory RM via a buffer register BMR of said memory RBM. A check decoding detecting circuit DEC checks and determines whether or not the received information is different from the information of the receiving buffer memory RBM and also decodes such information. A discriminating circuit SDE determines or discriminates whether or not the decoded information is directed to the station at which said circuit is located. The result of the determination by the discriminating circuit SDE is returned to the receiving buffer memory RBM. When the information is returned to the receiving buffer memory RBM, the result of the determination is stored in a bit A specifically provided in said memory.

A transmitting buffer register SBR receives the information transmitted from the command unit CMU (FIG. 3). Such information is coded by a check coding circuit COD. The coded data is then set in a transmitting register SR. The memory information stored in the transmitting register SR is then transmitted to the burst synchronism control unit BSU (FIG. 3) by a number equal to the number of bits of the order word channel for each frame. The timing is derived from the burst synchronism control unit BSU (FIG. 3) and is transmitted in the order channel of the burst. The informations for one word, that is, for one frame, are stored in the transmitting register SR.

Figure 7:
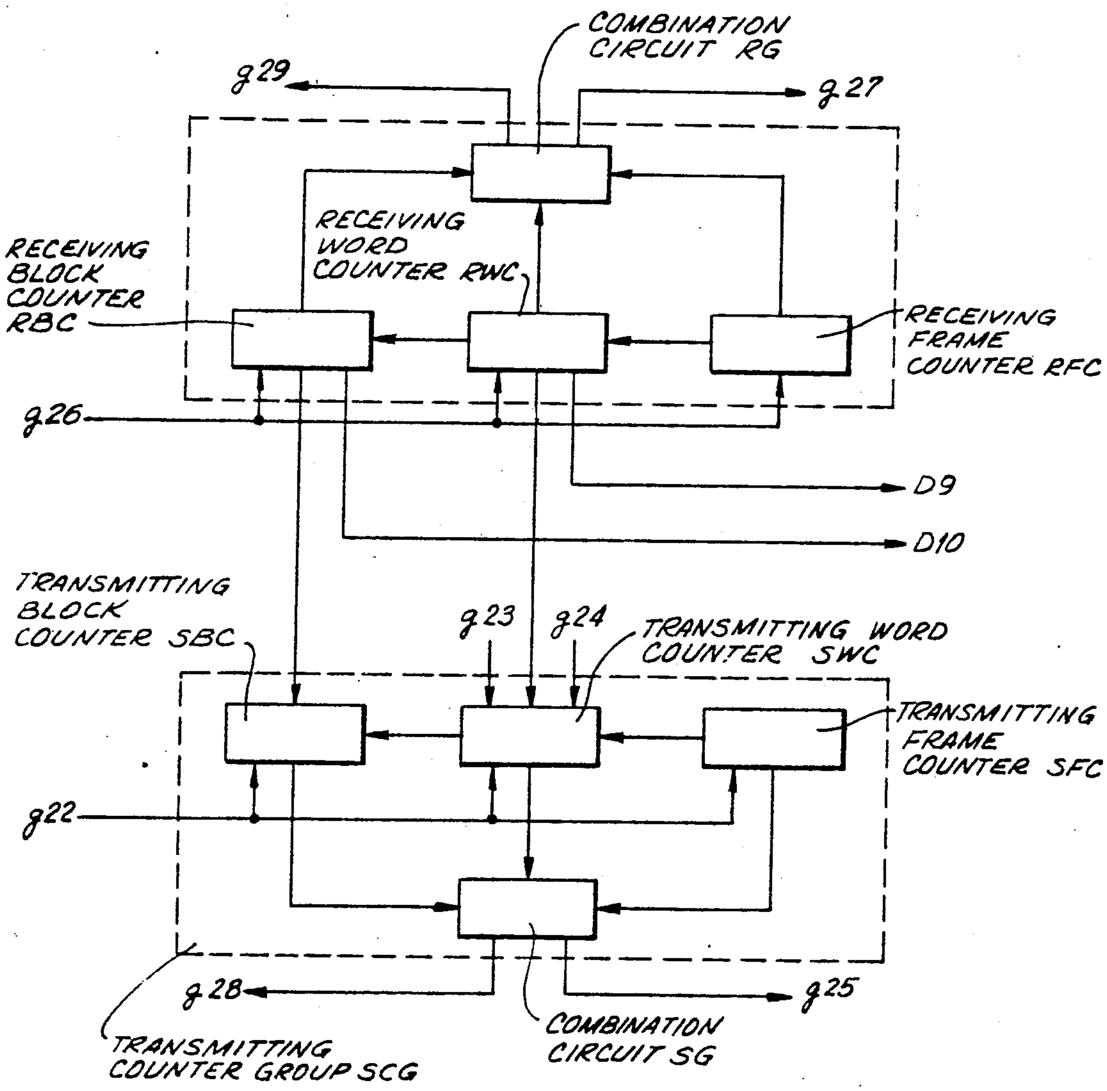
FIG. 7 is a block diagram of an embodiment of the transmitting counter group and the receiving counter group of FIG. 6.

A transmitting counter group SCG comprises a transmitting block counter SBC, a transmitting word counter SWC and a transmitting frame counter SFC, as shown in FIG. 7. The transmitting counter group counts the times or timing for the transmission. A receiving counter group RCG comprises a receiving block counter RBC, a receiving word counter RWC and a receiving frame counter RFC, shown in FIG. 7. The receiving counter group RCG counts the times or timing for reception. A retransmission requirement memory unit RSM stores or records the number of the transmitting station, the number of the receiving block and the number of the receiving word of erroneous information in the received data. The erroneous information may be eliminated by transmitting the requirement for retransmission to the transmitting station in accordance with the memory content of the retransmission requirement memory unit RSM, thereby receiving the correct information. A transmitting buffer register SMR is set by the output of the retransmission requirement memory unit RSM.

When the command unit CMU of the control circuit (FIG. 3) sets transmission data D14 in the transmitting buffer register SBR, information D16 of said buffer register is transferred to the check coding circuit COD. The information D16 is check coded and the available data D17 is then set in the transmitting register SR. The transmitting register SR then transmits informations to the burst synchronism control unit BSU of the control circuit (FIG. 3) in a number equal to the number of bits of the order word channel in each frame via a transmission starting signal $g21$ transmitted from said burst synchronism control unit via the transmitting counter group SCG. Upon the reception of the order word channel a receiving starting signal $g1$ transmitted from the burst synchronism control unit BSU (FIG. 3) and a burst discriminating signal $g2$ transmitted from said burst synchronism control unit are set in a control circuit CTL-2, in detail in FIG. 9B and function to initiate operation of said control circuit.

Figure 9A:
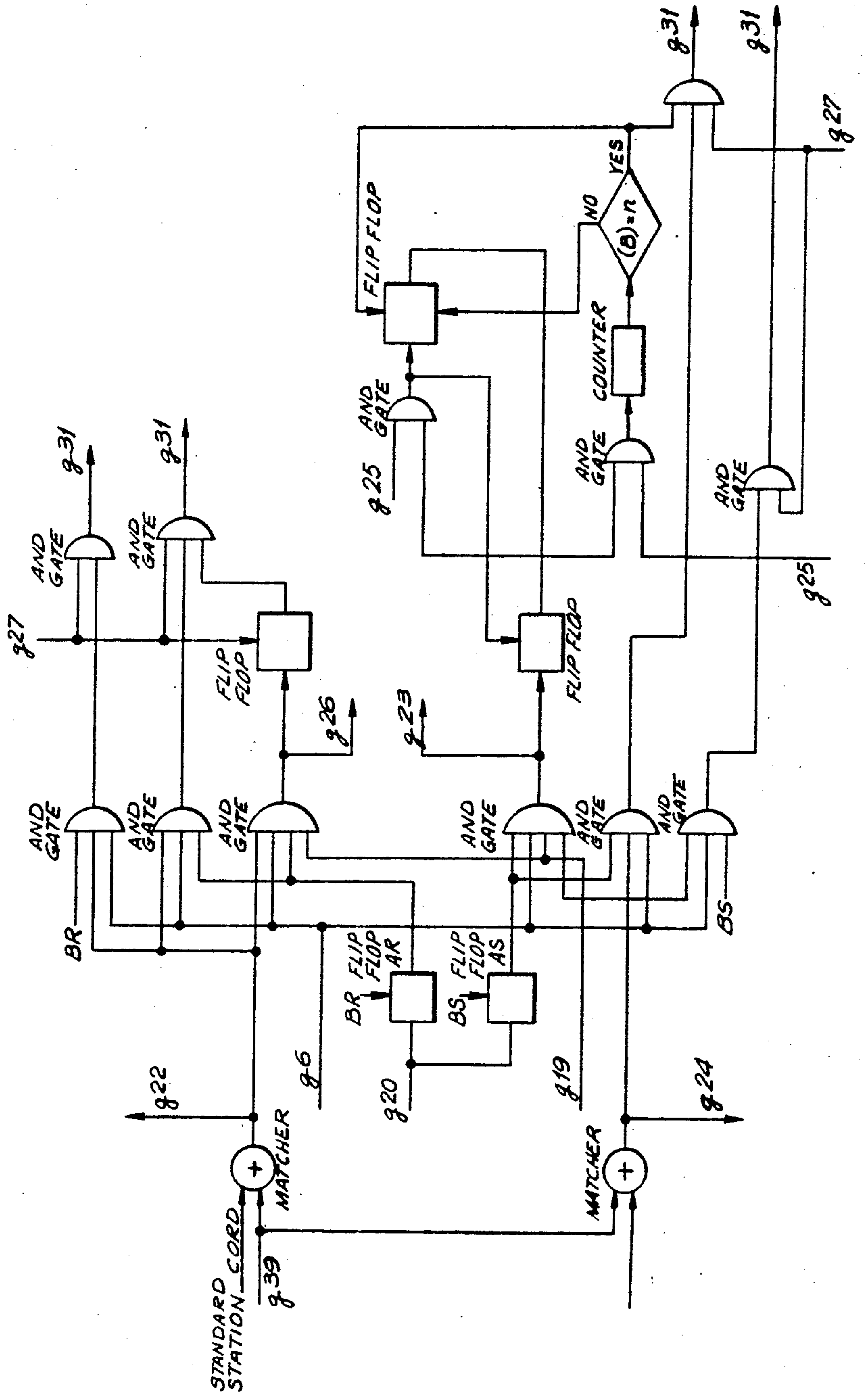
FIGS. 9A, 9B, 9C, 9D and 9E are block diagrams of an embodiment of the control circuits of FIG. 6.
Figure 9B:
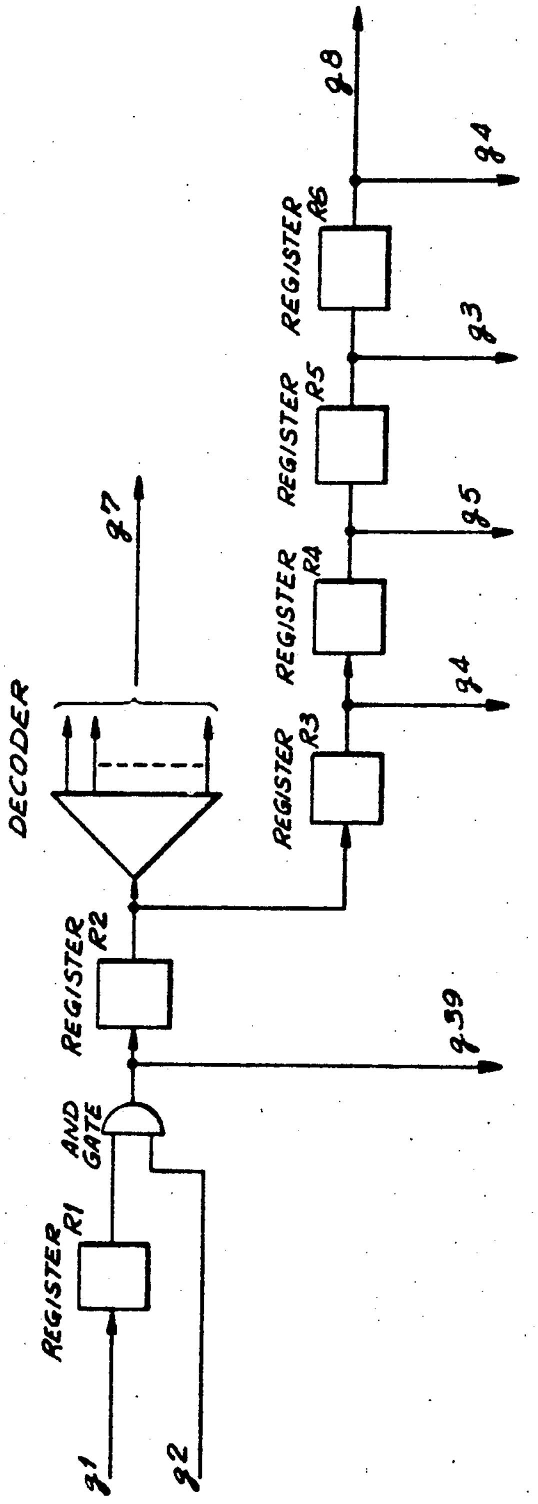

When the control circuit CTL-2 commences operation, it produces a control signal $g4$ from a register R3 (FIG. 9) and reads out data stored in the receiving memory RM to the buffer register MR. The address designation of the receiving memory RM is based upon the burst discriminating signal $g2$ previously set in the control circuit CTL-2. After data is read out to the buffer register MR, the column in said buffer register is shifted by the number of bits of the order word channel by a control signal $g5$ produced from a register R4 (FIG. 9B). A control signal $g3$ produced from a register R5 (FIG. 9) of the control circuit CTL-2 then sets the order word channel signal D1 from the burst synchronism control unit BSU in that bits of the buffer register MR which has become available due to the shifting of the column therein. The data of the buffer register MR is again written into the initial address of the receiving memory RM by the control signal $g4$, producing from a register R6 (FIG. 9B) of the control circuit CTL-2.

The aforedescribed control operation is provided for each reception of the order data channel of each frame until the data channels constitute one word. The number $l$ of the frames constituting the word is therefore counted by the counter RFC (FIG. 7) in the receiving counter group RCG. The counting operation of the counter RFC is initiated upon the reception of the receiving starting signal $g1$ from the burst synchronism control unit BSU (FIG. 3). When the number $l$ of the frames constituting the word is counted, the counter RFC overflows.

Figure 9C:
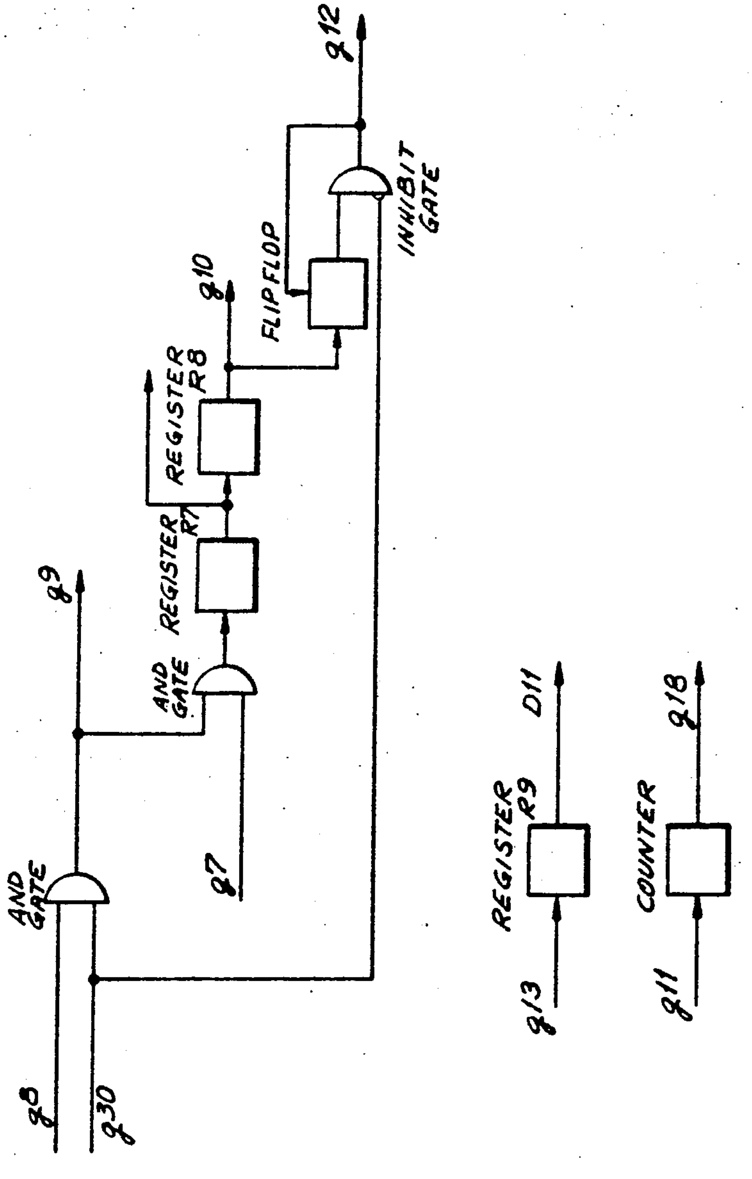

When the counter RFC overflows, a signal $g30$ is transmitted from said counter to a control circuit CTL-3. A control signal $g8$ from a register R6 (FIG. 9B) of the control circuit CTL-2 sets the order data channel signal D1 in the buffer register MR in each burst and is then supplied to the control circuit CTL-3 in detail in FIG. 9C. When the signal $g30$ is provided, the control signal $g8$ sets the address information $g7$, produced from a decoder (FIG. 9B) of the receiving buffer memory RBM in the control circuit CTL-3 and initiates operation of said control circuit. The control circuit CTL-3 sets data D3 of the buffer register MR in the buffer register BMR of the receiving buffer memory RBM via a control signal $g9$ produced from an AND-gate (FIG. 9C). The control circuit CTL-3 writes the data of the buffer register BMR into the receiving buffer memory RBM via a control signal $g10$ produced from a register R8 (FIG. 9C), and informations of the order word channel of each burst are written into the receiving memory RM and the receiving buffer memory RBM. When word data of the order word channels have been written into the receiving buffer memory RBM, for the bursts of all the stations in the communication system, the signal $g30$ is not produced.

When the signal $g30$ is not produced, the control circuit CTL-3 reads out the first address of the receiving buffer memory RBM to the buffer register BMR, initiates operation of the check decoding detecting circuit DEC by a control signal $g12$, adds data D6 of said buffer register to said check decoding detecting circuit, decodes the data D6 and sets the decoded data D7 in said buffer register.

The buffer register BMR supplies to the discriminating circuit SDE a discriminating signal D8 for discriminating or determining the station to which informations are to be transmitted. When a signal $g15$ is produced, indicating that the result of the check operation by the check decoding detecting circuit DCE is that there is no error, that is, when the signal $g15$ is 1, a register AF is set by input signals $g14$ and $g15$ to an AND-gate if the signal D8 is directed to the station of said discriminating circuit or transmitted in broadcasting style. The control circuit CTL-3 again writes the contents of the buffer register BMR and the register AF in the initial address of the receiving buffer memory RBM via the control signal $g10$. The contents of the register AF are written in the bit position A of the receiving buffer memory RBM.

When the register AF indicates a 1, this is integrated in the control circuit CTL-3 by a signal $g11$. When all the bursts are decoded, and the writing in of the initial address of the receiving buffer memory RBM is completed, and the control circuit CTL-3 determines by the result of the integration that there is one or more 1 stored in the bit position A of the receiving buffer memory RBM, said control circuit transmits a signal $g18$ producing from an AND-gate (FIG. 9C) requesting the read out to the command unit CMU and also transmits a signal $g32$ to said command unit requesting an interruption. When the command unit CMU (FIG. 3) interprets the request for read out of the receiving buffer memory RBM, it supplies the signal $g13$ to the control circuit CTL-3 commanding the read out of said buffer memory and continuously reads out the first to the last addresses of said buffer memory to the buffer register BMR. Furthermore, the buffer register BMR transfers data D19 to the command unit CMU (FIG. 3), which data is provided by removal of the signal for discriminating or determining the station to which informations are to be transmitted, and the check bit from the data of the buffer register BMR and the address of the receiving buffer memory RBM at the time. That is, data D20 identifying the transmitting station is transmitted to the command unit CMU (FIG. 3) only regarding the address when bit position A has a 1 stored therein.

The utilization of the receiving buffer memory RBM, as hereinbefore described, permits the logical delay time of checking and decoding to an extent equal to the time of a specific number of frames. The provision of the bit A in the receiving buffer memory RBM permits the supply to the command unit CMU of only the data necessary for the station of said receiving buffer memory. Consequently, the magnitude of data supplied to the command unit CMU (FIG. 3) and the amount of processing by said command unit may be reduced.

A specific station may provide word synchronism and block synchronism by first receiving the word and block of the standard station and then synchronizing the transmitting word and block of the specific station with the word and block of said standard station. The command unit CMU (FIG. 3) sets the receiving synchronism mode of a control circuit CTL-1, in detail in FIG. 9A, as a pattern SAR in flip-flop AR (FIG. 9A) via a signal $g20$ and supplies to said control circuit a signal $g19$ commanding said control circuit 1 to perform synchronization. The control circuit CTL-1 then initiates synchronization regarding the burst of the standard station.

When the synchronism mode is SAR, that is, when SW indicating the head of the block transmitted from the standard station is determined or detected, the control circuit CTL-1 supervises the coincidence of the block synchronism word pattern stored in the block synchronism pattern memory unit BSP with the data of the buffer register MR via the coincidence detecting circuit MAT in each frame. If coincidence is detected and a 1 is provided at the output $g6$ of the coincidence detecting circuit MAT, the receiving block counter RBC which counts the number of blocks $n$ in the receiving counter group RCG, the receiving word counter RWC which counts the number of words in a block and the receiving frame counter RFC which counts the number of frames $l$ are cleared by a control signal $g26$ produced from an AND-gate (FIG. 9A).

The receiving block counter RBC, the receiving word counter RWC and the receiving frame counter RFC (FIG. 7) of the receiving counter group RCG then resume counting. If the signal $g6$ may again be provided as a 1 when the contents of the receiving word counter RWC and the receiving frame counter RFC have overflowed and all become 0, it is determined that the word block of the specific station is in complete coincidence with the word block transmitted from the standard station. The synchronism mode of the control circuit CTL-1 is then caused to provide a synchronism mode or pattern CBR and the command unit CMU of the control circuit of FIG. 3 is advised of the completion of the word and block synchronism of the burst of the standard station.

If the synchronism mode or pattern is SBR, it is determined whether or not the signal $g6$ may be provided as a 1 when the contents of the counters RFC and RWC are 0. If, as a result, the signal $g6$ may be provided as a 0 several times in succession, the synchronism pattern or mode is changed to SAR and the command unit CMU is advised of the nonsynchronism of the burst of the standard station.

The synchronism of the transmitting burst of the specific station may be realized by transmitting the signal from said specific station to the satellite and receiving said signal from said satellite to said station and then comparing said signal with the signal of the standard station. After the synchronism pattern or mode have been changed to SBR, the command unit CMU (FIG. 3) sets the transmitting mode as a pattern SAS in a flip-flop AS (FIG. 9A), via a signal $g20$ supplied to the control circuit CTL-1. That is, the command unit CMU sets the mode or pattern of the condition for detecting the synchronism of the transmitting block with the standard station and transmits a command for word and block synchronism of the burst of the specific station via the signal $g19$. The command unit CMU clears the transmitting frame counter SFC, the transmitting word counter SWC and the transmitting block counter SBC of the transmitting counter group SCG via a control signal $g22$ produced from a matcher (FIG. 9A) and also initiates the counting operation of said counters.

When the content of the receiving frame counter RFC (FIG. 7) is 0 and the content of the transmitting block counter SBC (FIG. 7) is $n-1$, the coincidence detecting circuit MAT supervises the coincidence detecting output $g6$ of said detecting circuit with regard to the block synchronizing word and the burst of the specific station. When the signal $g6$ cannot be provided as 1, and the content of the transmitting block counter SBC (FIG. 7) is $n-1$, that is, when there is nonsynchronism, the count of the transmitting frame counter SFC (FIG. 7) is stopped by one frame via a control signal $g23$ produced from an AND-gate (FIG. 9A) when the count of said counter is changed from $n-1$ to 0, and the count of the word and block is corrected by one frame.

Whether or not the signal $g6$ may be provided as 1, with regard to the burst of the specific station is again supervised under the condition that the content of the receiving frame counter RFC (FIG. 7) is 0 while the content of the transmitting block counter SBC is $n-1$, and correction is repeated until the signal $g6$ may be provided as 1. If the signal $g6$ may be provided as 1, the synchronism pattern or mode is changed to SBS, that is, the transmitting block of the specific station completely coincides with the transmitting block of the standard station and the content $i$ of the receiving word counter RWC (FIG. 7) and the content $j$ of the receiving block counter RBC (FIG. 7) at such time are recorded or stored.

The transmitting burst of the specific station may be synchronized by setting the previously counted $i$ in the transmitting word counter SWC (FIG. 7) via a control signal $g24$ and setting a specific value in the transmitting block counter SBC (FIG. 7). The specific value set in the transmitting block counter SBC is provided by subtracting 1 from the count $j$ of the receiving block counter RBC (FIG. 7) when the synchronism mode is SBS and the count of the transmitting word counter SWC (FIG. 7) changes from m−1 to 0. The signal $g25$ advises the control circuit CTL-1 of the condition of the transmitting block counter SBC, the transmitting word counter SWC and the transmitting frame counter SFC of the transmitting counter group SCG. The signal $g25$ is provided by the combination circuit SG (FIG. 7). The signal $g27$ advises the control circuit CTL-1 of the condition of the receiving block counter RBC, the receiving word counter RWC and the receiving frame counter RFC of the receiving counter group RCG. The signal $g27$ is provided by the combination circuit RG (FIG. 7). Afterward, if $g6$ may be provided as 1, and the count of the transmitting block counter SBC is +1 greater than the count of the receiving block counter RBC when the count of each of the receiving frame counter RFC and the receiving word counter RWC is 0, the synchronism mode or pattern is changed to SCS and synchronism is confirmed by advising the command unit CMU (FIG. 3) that there is word synchronism and block synchronism regarding the burst of the specific station.

In the synchronism pattern SCS, whether or not $g6$ may be provided as 0 when the count of each of the receiving word counter RWC and the receiving frame counter RFC is 0, is supervised. If $g6$ may be provided as 0 several times in succession, the synchronism pattern is changed to SAS and the command unit CMU (FIG. 3) is advised of the nonsynchronism of the burst of the specific station. The command unit CMU is advised by a signal $g31$ of the change of condition regarding the word and block synchronism. The transmitting block synchronism time signal $g28$ becomes 1 when the transmitting word counter SWC (FIG. 7) has a count of 0 and the transmitting frame counter SFC (FIG. 7) has a count of $l-1$. The receiving block synchronism time signal $g29$ becomes 1 when the receiving word counter RWC (FIG. 7) has a count of 0 and the receiving frame counter RFC (FIG. 7) has a count of $l-1$.

Automatic retransmission error correction of the order word is 0 when there is a bit error in the order word channel. In any transmission error correction, it is necessary that the transmitting station be advised of the erroneous word discovered at the receiving station. The number of the erroneous word may be determined by noting that block synchronism is provided regarding all the stations of the communication system.

The processing of the data transmission invoiced the preparation by the command unit CMU of the station $i$ of the value $x$ of the transmitting block counter SBC (FIG. 7) and its inclusion in the transmitted data, the preparation of the value $y$ of the transmitting word counter SWC and its addition to the transmitted data and the transmitting data buffer table of the main memory of said command unit added to the transmitted data when transmitted data of $k$ bits is supplied to the order word control unit DLU. On the other hand, if error is detected in the received word at the other station at the check decoding detecting circuit DEC with regard to the burst, the output signal $g16$ of said check decoding detecting circuit (FIG. 6) initiates the operation of a retransmission control circuit CTL-4 in detail in FIG. 9D.

Figure 9D:
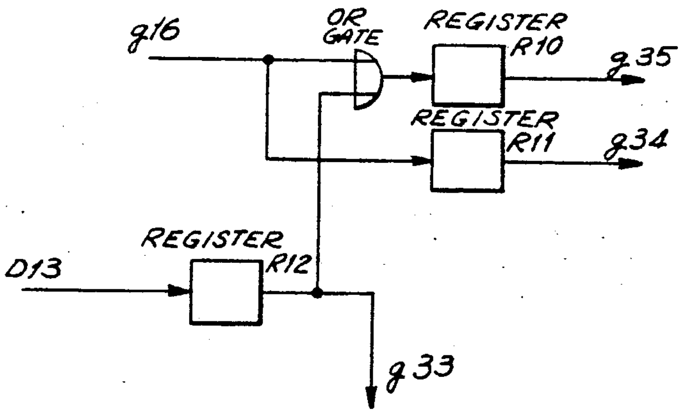
Figure 9E:
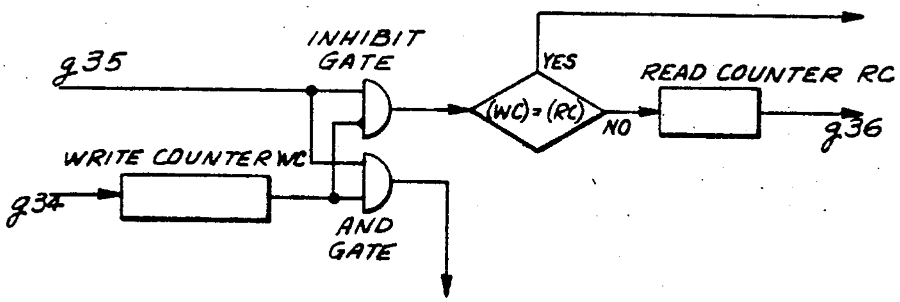

The retransmission control circuit CTL-4 sets the address in a control circuit CTL-5, in detail in FIG. 9E, of a retransmission requirement memory unit RSM via a control signal $g34$ produced from a register R11 (FIG. 9D), and initiates the operation of the control circuit CTL-5 via a control signal $g35$ produced from a register R10 (FIG. 9D). The retransmission control circuit CTL-4 stores the address D11 of the receiving buffer memory RBM at which the received word is stored, that is, the number of the station of the burst in which an error has been discovered, the value $x$ of the receiving block counter RBC (FIG. 7) and the value $y$ of the receiving word counter RWC (FIG. 7) supplied at the time from the control circuit CTL-3 to the retransmission requirement memory unit RSM. In other words, the retransmission requirement memory unit RSM stores the identification of the receiving station, the block number and the word number at the time of reception.

The control circuit CTL-5 includes a writing counter WC and a reading counter RC for the address designation for writing into and reading out of the retransmission requirement memory unit RSM. Both the writing counter WC and the reading counter RC of the control circuit CTL-5 are initially set to 0 and +1 is added to said writing counter WC each time the check out signal $g16$ provided by the check decoding detecting circuit DEC is 1. The counter of the writing counter WC is supplied from the retransmission control circuit CTL-4 to the control circuit CTL-5 as the address for the retransmission requirement memory unit RSM via the signal $g34$. Each time retransmission is requested, +1 is added to the count of the reading counter RC and such count is supplied from the retransmission control circuit CTL-4 to the control circuit CTL-5 via the signal $g34$ as the address for the retransmission requirement memory unit RSM. The retransmission control circuit CTL-4 is cleared when the contents of the reading counter RC and the writing counter WC of the control circuit CTL-5 become equal.

If retransmission is requested, the retransmission request information is read out from the retransmission requirement memory unit RSM to the transmitting buffer register SMR under the control of the control circuit CTL-5, and data D15 is provided by the retransmission control circuit CTL-4 to the transmitting buffer register SBR via the control signal $g33$ produced from a register R12 (FIG. 9D). When the signal $g33$ is 1, the transmission of data from the command unit CMU is postponed. After the transmitting buffer register SBR is set, the operation is similar to that of the aforedescribed data transmission.

If it is assumed that the error occurred in data of the $y^{th}$ word of the $x^{th}$ block, which is transmitted from station $i$ to station B, the order word control units DLU (FIG. 3) of all the stations of the system other than the station $i$ transmit requests for retransmission RRm, RRn, . . . to the station $i$. Upon receipt of the request for retransmission, the station $i$ does not determine whether or not the data is a request for retransmission by the order word control unit DLU, but simply transfers the data to the command unit CMU as data directed to the station $i$. The command unit CMU (FIG. 3), knowing that the data is a request for retransmission, searches the transmission data stored in the transmitting data buffer table of the main memory of said command unit and retransmits the transmission data.

Burst synchronism control unit BSU was described above briefly with reference to FIG. 3 but now the burst synchronism controlling function will be explained in detail with reference to FIGS. 8A and 8B.

Figure 8A:
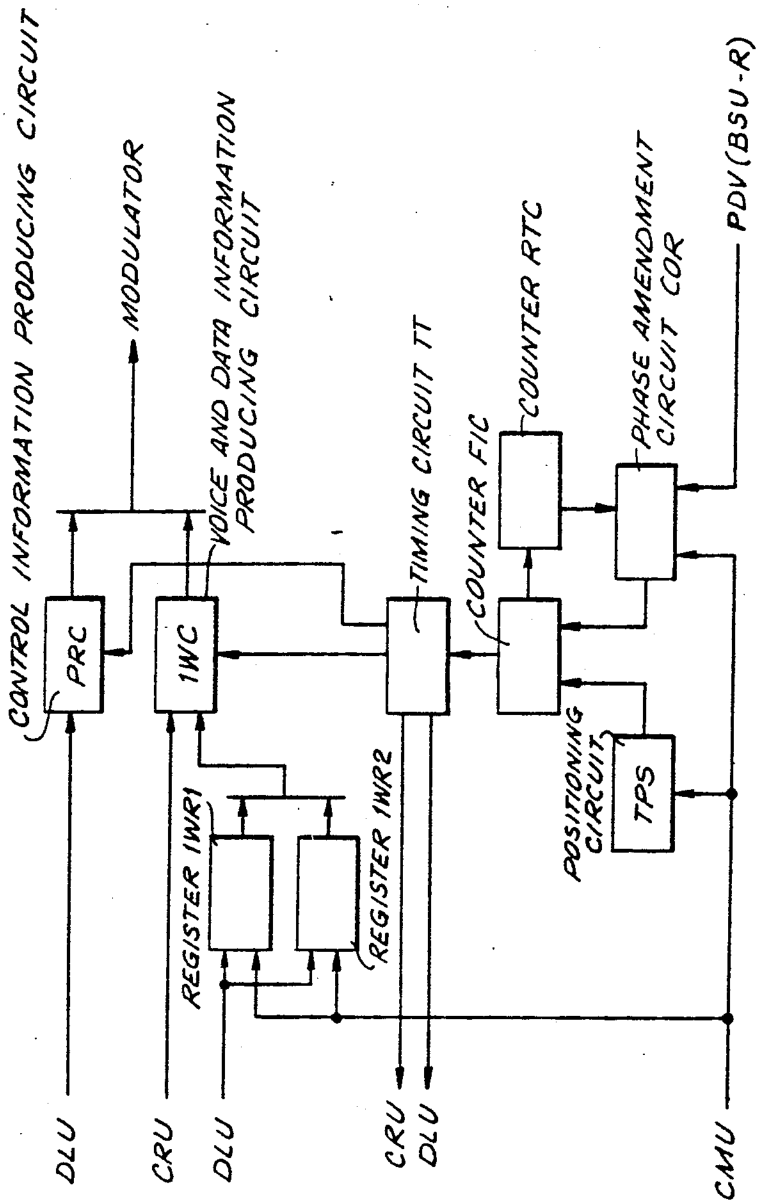
FIG. 8A is a block diagram of an embodiment of the transmission part of burst synchronism control unit.

FIG. 8A explains the sending part of the burst synchronism control unit BSU. In FIG. 8A, FIC is a counter circuit for counting the frame period. TT is a timing circuit of the sending part started by counter circuit FIC. And this timing circuit TT sends out the start signal of the transmitting frame to the above-mentioned channel rearrangement control unit CRU and order word control unit DLU and also controls the timing for sending out to the satellite the transmitting burst composed by controlling control information producing circuit PRC for forming the control information (the control information in FIG. 2) comprising the channel signal DL for order word sent from DLU by the start of TT and voice and data information producing circuit IWC for forming the transmitting channel signal (voice and data information in FIG. 2) from the signal sent from CRU based on the contents of IWR described below by controlling the burst length. IWR is a register circuit for regulating the transmitting burst length, and this IWR comprises the presently used circuit and the reserve circuit. The selection between these two circuits is performed by the selecting signal from order word control unit DLU, and the bank on the side of the reserve circuit can be freely rewritten from command unit CMU. Therefore the transmitting burst length can be changed by previously writing the new burst length in the reserve circuit of IWR and then changing the selecting signal from order word control unit DLU, i.e., by giving a switching command. TPS is a positioning circuit for setting the position of the burst of the station to which said circuit belongs on the frame at the moment of start of transmission of said station's burst, and the value of this TPS is set from command unit CMU. This value is a value for making the phase difference between a specific station which has already started transmission, i.e., the standard station and said station equal to the designated phase difference. That is, this is a circuit for making it possible to perform the initial sending out of said station's burst, i.e., what is called the initial acquisition by starting said counter circuit FIC after a period of time expressed by the contents of position setting circuit TPS has passed from the moment of reception of the standard station's burst by the receiving part of burst synchronism control unit BSU. And RTC is a counter circuit for counting the period of time required for said station's burst to be transmitted between the satellite and said station. The object of this circuit is to start phase-correcting circuit COR for correcting the moment of sending out of the burst based on the phase difference deviation PDV between the standard station's burst and said station's burst detected in the receiving part of burst synchronism control unit BSU. Even if the moment of sending out is corrected by the detection of a certain phase difference deviation, a long period of time is required until the detection of the result of correction and therefore if the next correction is performed in haste, the right correction cannot be performed and what is called the oscillation phenomenon of the control system is caused, and said counter circuit RTC is provided with the purpose to prevent such oscillation phenomenon.

Figure 8B:
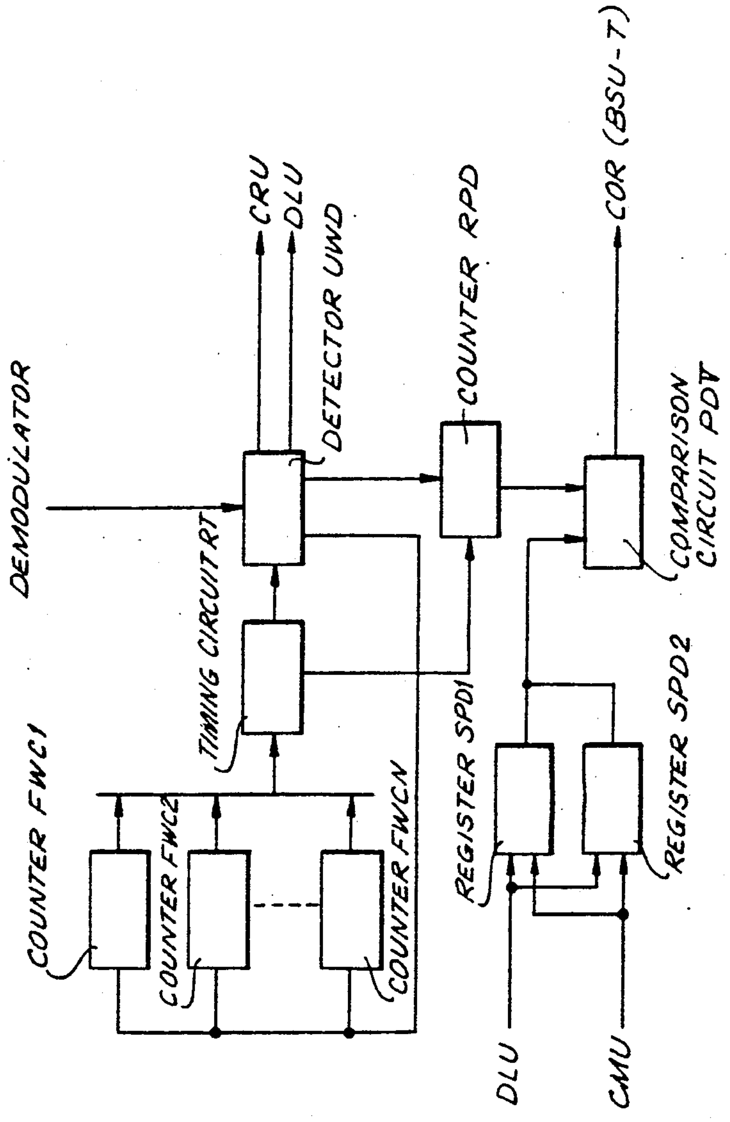
FIG. 8B is a block diagram of an embodiment of the receiving part of burst synchronism control unit.

FIG. 8B shows the receiving part of the burst synchronism control unit BSU. $FWC_1$–$FWC_N$ are counter circuits for counting the frame period provided corresponding to stations transmitting bursts, and the object of these counter circuits is to forecast the position of reception in the next frame. RT is a timing circuit of the receiving part of BSU which is started by the overflow of one of counters $FWC_1$–$FWC_N$. UWD is a unique word-detecting circuit for detecting the signal for discriminating the station included in the control information of the receiving burst, i.e., what is called the unique word, and this LWD is started at the moment at which the reception is forecast by timing circuit RT. The moment of detection of the unique word by unique word-detecting circuit UWD is sent out to channel rearrangement control unit CRU and order word control unit DLU as the burst synchronism timing. And the correction of the forecast position in the next frame of counter FWC for the burst is also performed at this moment. RPD is a counter circuit which is started at the burst synchronism timing by the reception of the standard station's signal and stopped at the burst synchronism timing by the reception of said station's signal, and this RPD is used to measure the phase difference between the standard station's burst and said station's burst on the frame. And SPD is a register circuit for designating the standard phase difference between the standard station's burst and said station's burst, and the phase difference deviation between the standard station and said station can be detected by comparing the contents of register circuit SPD with the contents of counter circuit RPD in comparing circuit PDV. This detected value is used as the correction value of phase-correcting circuit COR in the sending part of burst synchronism control unit BSU described above. Register circuit SPD comprises two circuits, one being used as the presently used circuit and the other being used as the reserve circuit, and one of these two circuits is designated as the presently used circuit by the selecting signal from order word control unit DLU. SPD on the side of the reserve circuit can be freely rewritten from command unit CMU. Namely, when the burst length is changed by the variation of the traffic, it will sometimes become necessary to change the phase difference between the standard station and said station, but in such a case, if the new phase difference is written in SPD on the side of the reserve circuit and then the presently used circuit and the reserve circuit are switched by the selecting signal from order word control unit DLU, the transmission phase of said station's burst can be corrected automatically by the operation of comparing circuit PDV, counter circuit RTC and phase correcting circuit COR.

Although the system described herein is a PCM time division multiplexing multiple access communication system, our invention is not limited to such a system but is applicable to time division multiplexing communication system in general.

Each block of each FIG. hereof, except those whose circuits are shown in separate FIGS., constitutes a know circuit which functions in the described manner.

While the invention has been described by means of specific examples and in a specific embodiment, we do not wish to be limited thereto, for obvious modifications will occur to those skilled in the art without departing from the spirit and scope of the invention.

We claim

1. A time division multiplexing communication system having a plurality of stations and a switching station (SA), two of said stations communicating with each other via the switching station by utilizing signals comprising a block having a plurality of words each comprising a plurality of frames which are bursts of a constant time length, each of said stations comprising channel rearrangement control means for rearranging ground channels to satellite channels and for rearranging satellite channels to ground channels in accordance with informations from an order data channel; burst synchronism control means (BSU) connected to the channel rearrangement control means for providing the timing of transmission and reception of bursts; order word control means (DLU) connected to the channel rearrangement control means for receiving command data, providing an order data channel, changing the command data to the format of the order data channel, transmitting said format to the other stations and assembling a word from the order data channel information received from the other stations; command control means (CMU) connected to the order word control means, the channel rearrangement control means and the burst synchronism control means and controlled by a program to discriminate the condition of operation of the channel rearrangement control means, the burst synchronism control means and the order word control means and supplying thereto command data commanding said means to operate, said order word control means transferring the word assembled from the order data channel received from the other stations to the command control unit when said word is directed to the station; block synchronism controlling means for controlling the timing of transmission and reception of the blocks and providing block synchronism for blocks of period *TB* determined in accordance with the equations $$nTB \geq TI+TP$$

and $$(n-1)TB \leq TS$$

wherein *TB* is the period of the block period, *TS* is the period of time required for an electrical wave to travel from the station closest to the switching station and back to said station, *TI* is the period of time required for an electrical wave to travel from the station farthest from the switching station and back to said station, *TP* is the period of time required for each of the stations to provide the necessary operations based on received information and *n* is a positive integer.

2. A time division multiplexing communication system as claimed in claim 1, wherein the switching station is a satellite in space.

3. A time division multiplexing communication system as claimed in claim 1, wherein said channel rearrangement control means includes a pair of channel number memory circuits for storing the relation between the time division channels and the time division multiplexing channels, one of said channel number memory circuits being utilized and the other being held in reserve, said plurality of stations including a standard station for transmitting the command for switching of the relation between channels to all the stations at an arbitrary time in broadcasting type in a manner whereby a station of said plurality of stations receiving said switching command writes the new relation between channels into the channel number memory circuit held in reserve and switches the previously utilized channel number memory circuit to reserve and said station transmits audio information by the new relation at the instant of completion of transmission of a word at the head of the first transmitting block after the reception of the switching command.

4. A time division multiplexing communication system as claimed in claim 1, wherein each station of said system has a block synchronism signal pattern and wherein said order word control means comprises a receiving memory for receiving and storing order channels, a coincidence-detecting circuit coupled to said receiving memory for supervising the coincidence of data stored in said receiving memory with the block synchronism signal a pattern, and a counter group coupled to said coincidence detecting circuit including block counting means for counting the number of blocks equal to the time required for the propagation of an electric wave between stations, word counting means for counting the number of words in a block and order channel counting means for counting the number of order channels in a word for correcting the time of initiation of a word and a block to provide a coincidence detecting output relating to the block synchronism signal pattern of a specific station in the frame of the coincidence detecting output of the block synchronism signal pattern of a standard station provided by counting of said counter group and for synchronizing so that time gaps in the blocks of all the stations of said system are received in the same frame.

5. A time division multiplexing communication system as claimed in claim 1, wherein said command means includes first memory means for storing transmission information, transmitting the block number and transmitting the word number relating to the transmission information and said order word control means includes second memory means for requesting retransmission and storing the transmitting station number, receiving block number and receiving word number of received information, said order word control means correcting error by providing the request for retransmission from the stored contents of said second memory means and retransmitting the transmission information from the stored contents of said first memory means.

6. A time division multiplexing communication system as claimed in claim 1, wherein said order word control means comprises a receiving memory for successively storing received informations and a receiving buffer memory coupled to said receiving memory for restoring the stored information of said receiving memory when a specific magnitude of information have been stored in said receiving memory, said receiving buffer memory storing a bit indicating if the information is directed to the station of said receiving buffer memory, and means for transmitting to said command unit under the control of said bit only the information directed to the station of said receiving buffer memory.

7. A time division multiplexing communication system as claimed in claim 3, wherein said channel rearrangement control means includes a second pair of channel memory circuits, one of said second pair of channel number memory circuits being utilized and the other being held in reserve, the previously reserved channel number memory circuit of said second pair being switched to utilization and the previously utilized channel number memory circuit of said second pair being switched to reserve after a delay of a number of blocks equal to the time required for the propagation of an electrical wave between stations after the reception of said switching command.

8. A time division multiplexing communication system as claimed in claim 4, wherein when the word counting means and the order channel counting means have specific magnitudes a synchronous condition is supervised in accordance with the provision of said coincidence detecting circuit of a coincidence output relating to the block synchronism signal pattern.

9. A time division multiplexing communication system as claimed in claim 6, wherein said order word control means further comprises a discriminating circuit coupled to said receiving buffer memory for determining the station to which a signal is to be transmitted and a check decoding detecting circuit coupled to said receiving buffer memory, said receiving buffer memory storing decoded information and said receiving buffer memory having a bit position for indicating whether information is directed to the station thereof in the address for storing decoded information, and when a signal is determined to be directed to the station of said discriminating circuit by said discriminating circuit and when received information is determined to be error-free by said check decoding detecting circuit, the received information is written into said specific bit position of said receiving buffer memory.

* * * * *